United States Patent
Ferre' et al.

(10) Patent No.: US 10,689,211 B2
(45) Date of Patent: Jun. 23, 2020

(54) PIPE FOR CONVEYING ABRASIVE MATERIALS SUCH AS CONCRETE, APPARATUS AND METHOD FOR PRODUCING SAID PIPE

(71) Applicant: Valme S.R.L.—Unico Socio, Rogolo (IT)

(72) Inventors: Fabio Ferre', Morbegno (IT); Domenico Mottarella, Cosio Valtellino (IT); Davide Cipolla, Cantù (IT)

(73) Assignee: VALME S.R.L.-UNICO SOCIO, Rogolo (IT)

( * ) Notice: Subject to any disclaimer, the term of this patent is extended or adjusted under 35 U.S.C. 154(b) by 342 days.

(21) Appl. No.: 15/559,920

(22) PCT Filed: Jul. 22, 2015

(86) PCT No.: PCT/IB2015/055557
§ 371 (c)(1),
(2) Date: Sep. 20, 2017

(87) PCT Pub. No.: WO2016/151370
PCT Pub. Date: Sep. 29, 2016

(65) Prior Publication Data
US 2018/0072513 A1 Mar. 15, 2018

(30) Foreign Application Priority Data
Mar. 20, 2015 (IT) .............................. MI2015A0423

(51) Int. Cl.
*B21C 37/28* (2006.01)
*B65G 53/52* (2006.01)
(Continued)

(52) U.S. Cl.
CPC .......... *B65G 53/523* (2013.01); *B21C 37/154* (2013.01); *B21C 37/28* (2013.01);
(Continued)

(58) Field of Classification Search
CPC . F16L 43/007; F16L 57/06; F16L 9/18; B21C 37/28; B21C 37/154; B65G 53/32; B21D 22/025
(Continued)

(56) References Cited

U.S. PATENT DOCUMENTS 4,130,300 A * 12/1978 Sheridan ................. F16L 57/06
285/16
4,461,498 A * 7/1984 Kunsman ................ F16L 57/06
285/112
(Continued)

FOREIGN PATENT DOCUMENTS

DE 102004038138 2/2006
EP 1873440 1/2008
(Continued)

OTHER PUBLICATIONS

International Search Report and Written Opinion of PCT/IB2015/055557 dated Dec. 18, 2015, 12 pages.

*Primary Examiner* — David Bochna
(74) *Attorney, Agent, or Firm* — Rankin, Hill & Clark LLP

(57) ABSTRACT

A method and apparatus for producing a curved tubular segment includes obtaining a curved external tubular element and a curved internal tubular element. The curved internal tubular element is made of a material having a resistance to wear greater than that of the curved external tubular element and has a cross section such as to cover at least part of the internal surface of the curved external tubular element. The curved internal tubular element is inserted inside the curved external tubular element after heating the latter by a heating unit. To form the curved external tubular element on the exact geometry of the curved internal tubular element, a molding unit and a cooling unit (Continued)

are used to obtain a curved tubular segment without spaces between the curved external tubular element and the curved internal tubular element.

10 Claims, 3 Drawing Sheets

(51) Int. Cl.
| | |
|---|---|
| *B23P 11/02* | (2006.01) |
| *F16L 43/00* | (2006.01) |
| *B21D 22/02* | (2006.01) |
| *F16L 57/06* | (2006.01) |
| *B21C 37/15* | (2006.01) |
| *B65G 53/32* | (2006.01) |
| *F16L 9/18* | (2006.01) |
| *F16L 23/00* | (2006.01) |
| *B21D 39/04* | (2006.01) |
| *F16L 58/10* | (2006.01) |
| *F16L 13/02* | (2006.01) |

(52) U.S. Cl.
CPC ......... *B21D 22/022* (2013.01); *B21D 22/025* (2013.01); *B23P 11/025* (2013.01); *B65G 53/32* (2013.01); *F16L 9/18* (2013.01); *F16L 23/00* (2013.01); *F16L 43/001* (2013.01); *F16L 57/06* (2013.01); *B21D 39/04* (2013.01); *F16L 13/02* (2013.01); *F16L 58/1036* (2013.01)

(58) Field of Classification Search
USPC .......................................... 285/16, 182, 179
See application file for complete search history.

(56) References Cited

U.S. PATENT DOCUMENTS

| | | | | | |
|---|---|---|---|---|---|
| 4,633,913 | A | * | 1/1987 | Carty | B65G 53/523 138/147 |
| 4,865,353 | A | * | 9/1989 | Osborne | F16L 43/00 285/16 |
| 5,044,670 | A | * | 9/1991 | Esser | F16L 57/06 285/112 |
| 5,170,557 | A | * | 12/1992 | Rigsby | B21C 37/154 138/148 |
| 5,188,396 | A | * | 2/1993 | Calvin | F16L 57/06 285/16 |
| 5,275,440 | A | * | 1/1994 | Esser | B65G 53/523 138/149 |
| 5,301,984 | A | * | 4/1994 | Farris | F16L 43/00 285/179 |
| 5,363,544 | A | * | 11/1994 | Wells | B21C 37/154 138/114 |
| 5,718,461 | A | * | 2/1998 | Esser | B65G 53/523 285/179 |
| 6,375,228 | B1 | * | 4/2002 | Klemm | F16L 23/04 285/112 |
| 6,467,812 | B1 | * | 10/2002 | Klemm | E04G 21/04 285/55 |
| 6,520,213 | B1 | * | 2/2003 | Esser | B65G 53/523 138/109 |
| 7,238,317 | B2 | * | 7/2007 | Hegler | B29C 49/0021 264/508 |
| 2002/0005222 | A1 | * | 1/2002 | Esser | F16L 43/001 138/109 |
| 2005/0034306 | A1 | | 2/2005 | Patberg et al. | |
| 2006/0054231 | A1 | * | 3/2006 | Wolfram | B65G 53/32 138/109 |
| 2008/0298908 | A1 | * | 12/2008 | Esser | B65G 53/523 406/191 |
| 2012/0204992 | A1 | | 8/2012 | Park et al. | |
| 2013/0126033 | A1 | | 5/2013 | Cipolla et al. | |
| 2014/0283942 | A1 | | 9/2014 | Ferre et al. | |

FOREIGN PATENT DOCUMENTS

| | | | | |
|---|---|---|---|---|
| GB | 835259 A | * | 5/1960 | ............ B21C 37/28 |
| JP | S57194832 | | 11/1982 | |
| JP | S6137318 | | 2/1986 | |
| JP | H0199725 | | 4/1989 | |

* cited by examiner

PIPE FOR CONVEYING ABRASIVE MATERIALS SUCH AS CONCRETE, APPARATUS AND METHOD FOR PRODUCING SAID PIPE

FIELD OF THE INVENTION

The present invention concerns an apparatus and a method to make a tube to transfer abrasive materials, in particular a curved segment of tube, suitable to be connected with other rectilinear or curved tubular elements to define a conveying element for concrete or other abrasive material in a fluid state. In particular, the field of application of the present invention is the building trade, although the present invention can also be used in other industrial sectors.

BACKGROUND OF THE INVENTION

In the field of building constructions, it is known to use metal tubular elements of the modular type which are connected to each other to make a tube that allows to transfer concrete from a container, for example a truck-mounted mixer, to a casting zone, by means of pumping devices.

The tube normally comprises rectilinear tubular segments or elements disposed in sequence, which are connected by curved tubular joints, or connector elements, which have standardized angles of longitudinal development, for example 15°, 30°, 45°, 60° or 90°.

The curved tubular elements, compared to the rectilinear ones, are more subject to an abrasive action on the internal surfaces, mainly due to the action of the centrifugal force that the concrete exerts on the internal surfaces, in particular on the part that is external during use, that is, along the extrados.

In particular, along the extrados of the curved tubular joint, the speed of travel of the concrete and its force of impact are much higher than those along the intrados, that is, the zone with the smaller radius of curvature. This leads to a greater wear on the internal surface of the extrados.

A curved tubular joint is known, from the European patent application EP-A-1873440, which comprises a first tubular part, more external, made of material with high mechanical resistance, and a second tubular part, disposed inside the first and made of material with high resistance to wear. In other words, the curved tubular joint consists of two curved tubes, of different material, one inside the other, in which the internal one constitutes an anti-wear lining to increase the working life of the tube.

In this document, to clamp the two tubular parts together, on the external surface of the internal tubular element, near its extrados, spacer elements are made that keep it separate from the external tubular element, in this way to create an interspace which fills with concrete during the first use of the tube: once the concrete has set, it makes the external tubular element solid with the internal one. The known curved joint has the disadvantage, however, that it is rather complex to make, and it is very heavy and very expensive.

This production method has the disadvantage that if the spaces between the two parts are not filled, or not completely filled, this can cause breakages of the internal element, which is produced with very hard materials, resistant to wear, but also very fragile.

On the other hand, it is known that it is very difficult to introduce a curved tubular element inside another curved tubular element because it is necessary to force the parts during the coupling step.

To reduce this complexity, in some known solutions, it is provided to make the internal tubular element in sectors with a circumferential extension, which are inserted individually in the external tubular element and brought close to each other.

However, this known solution does not eliminate these disadvantages completely, and makes the production of the joint complex; it also necessitates another step of clamping the individual components of the second tubular part with respect to the first.

A method to make a curved tubular joint is also known, described in WO2012/017286, which comprises using a curved anti-wear insert which is disposed during use inside the curved tubular element and through which the abrasive material to be transferred passes.

During the production of the curved tubular joint, the curved anti-wear insert is disposed inside a mold and molten steel is cast around its peripheral surface to make an external jacket that, once solidified, forms the external part of the tubular joint. However, this method too is complex and requires long execution times.

One purpose of the present invention is to make a tube for transporting concrete or other abrasive materials in the fluid state which is reliable and long-lasting, simple to make, and relatively light and economical.

Another purpose of the present invention is to make a tube for transporting concrete or other abrasive materials in the fluid state which allows to achieve long operating lives and is also resistant to strong stresses.

Another purpose of the present invention is to perfect an apparatus and a corresponding method to make a tube, or segment of it, having at least one curved segment, which are relatively simple and rapid in execution times.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a method for making a tube, in particular a curved tube, for transferring abrasive materials such as concrete or suchlike, comprises making a curved external tubular element and a curved internal tubular element as separate components. The curved internal tubular element, or anti-wear insert, is made of a material having a resistance to wear greater than that of the curved external tubular element. It has a cross section such as to cover at least part of the internal surface of the curved external tubular element, thus defining, together with part of the internal surface of the curved external tubular element, or completely by itself, the passage cavity for the abrasive material.

According to one aspect of the present invention, the method to make a tube, in particular a curved tube, in accordance with forms of embodiment described hereafter, provides to use a forming mold made of an upper part and a lower part.

According to one aspect of the present invention, the method comprises:

separately making a curved external tubular element and a curved internal tubular element, the curved external tubular element having in each part an internal diameter greater than or equal to the external diameter of the curved internal tubular element, wherein the two tubular elements define, when coupled together, the tube to be obtained, heating the curved external tubular element to around its temperature of deformation, inserting the curved internal tubular element inside the curved external tubular element when it is in a heated condition, closing the forming mold to apply a pressure on the external surface of the curved external tubular element against the external surface of the curved internal tubular element;

cooling the tubular elements. Thanks to the shrinkage effect due to cooling, and the combined effect of the pressure generated by the mold, a tube without gaps between the curved external tubular element and the curved internal tubular element is thus obtained.

In this way it is therefore possible to obtain a tube, simply and quickly, in particular a curved tube, light and with a long working life.

With the method according to the present invention, it is possible to make separately, in a simple way and without technological constraints, both the curved external tubular element and also the curved internal tubular element in a definitive form without requiring further working to complete them, and with the required mechanical characteristics and shape.

Once the curved external tubular element has been formed on the curved internal tubular element, the curved internal tubular element remains constrained inside and can no longer move.

The equipment required for the execution of the method comprises simple components normally available on the market and with limited costs.

In one form of embodiment, it is provided that the curved internal tubular element has a tubular cross section with a shape mating to the complete section of the internal surface of the curved external tubular element.

In another form of embodiment, the curved internal tubular element has a cross section such as to cover only part of the section of the internal surface of the curved external tubular element.

The present invention also concerns a tube obtained with the method described above.

The present invention also concerns the apparatus that allows the tube to be made with the method described above, which apparatus comprises:

at least one heating unit to heat the curved external tubular element to a value near its temperature of deformation;

at least one molding unit consisting of at least one forming mold that closes to apply a pressure on the external surface of the curved external tubular element against the external surface of the curved internal tubular element;

at least one cooling unit to obtain the shrinkage effect of the curved external tubular element by means of cooling and thus obtaining a tube without gaps between the curved external tubular element and the curved internal tubular element.

BRIEF DESCRIPTION OF THE DRAWINGS

These and other characteristics of the present invention will become apparent from the following description of some forms of embodiment, given as a non-restrictive example with reference to the attached drawings wherein.

Figure 1:
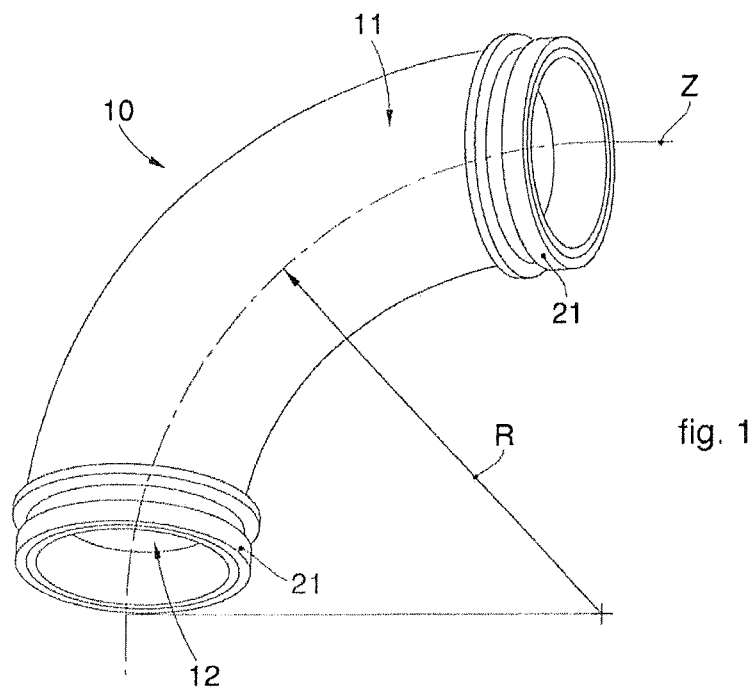
FIG. 1 is a perspective view of a segment of a curved tube according to the present invention.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENT

With reference to FIG. 1, a tube, hereafter referred to as curved tubular element 10, to transfer abrasive materials such as concrete or similar, according to the present invention, in this case comprises a curved external tubular element 11, with a curved extension along a curved axis Z, in this case shaped like the arc of a circle, inside which a curved internal tubular element 12 or anti-wear insert is disposed.

In the forms of embodiment shown in FIGS. 1-9, the curved external tubular element 11 has an annular cross section.

Forms of embodiment provide that the curved external tubular element 11 is made of metal material such as carbon steel or light alloys with an aluminum base or other heat deformable materials, with characteristics of great mechanical resistance.

Merely by way of non-restrictive example, the curved external tubular element 11 is made of aluminum with an internal diameter of about 125 mm, a thickness of about 7 mm, and an average radius of curvature R of about 240 mm.

The curved external tubular element 11, in the case where it extends in an arc of a circle, develops, along the curved axis Z, for example for an angle comprised between 10° and 180°, in this specific case about 90°.

The curved external tubular element 11 has an internal surface 13 and an external surface 14. The curved internal tubular element 12 also has an internal surface 16 and an external surface 15.

The curved internal tubular element 12, which develops for at least part of the curved extension of the curved external tubular element 11 and has a cross section such as to cover at least part of the internal surface 13, is inserted into the curved external tubular element 11 in intimate contact with its internal surface 13.

The curved internal tubular element 12 is made of a very hard material with a resistance to wear greater than that of the material with which the curved external tubular element 11 is made.

Forms of embodiment of the present invention provide that the curved internal tubular element 12 is made of ceramic materials, high-resistance steels, cast iron fusions with a high chromium content, chromium carbides or other types of carbides.

Figure 2:
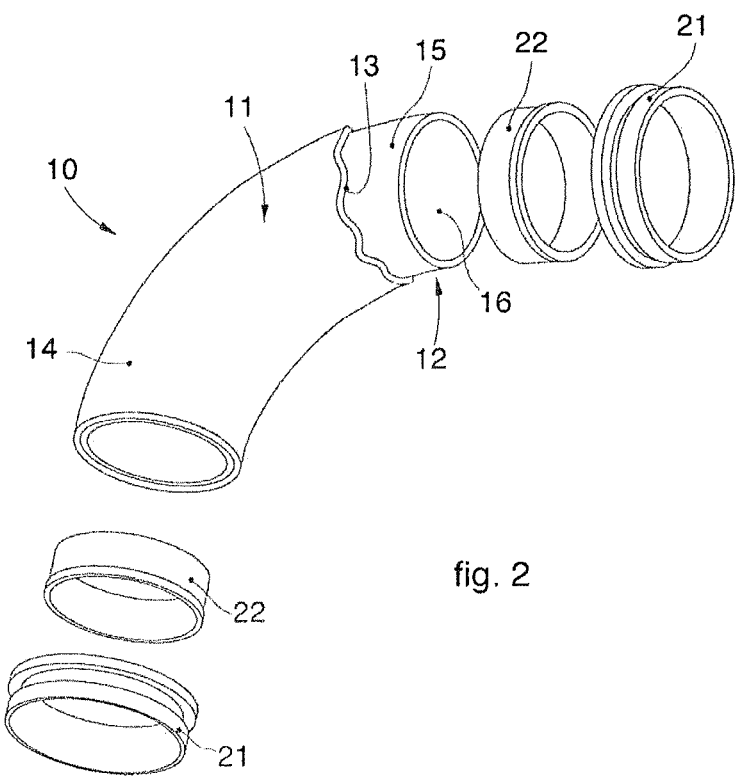
FIG. 2 is an exploded view of the segment of tube in FIG. 1.
Figure 3:
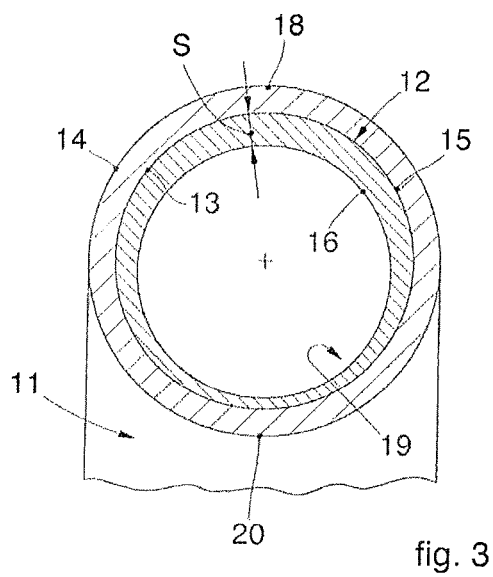
FIG. 3 is a section view of a first variant of the segment of tube in FIG. 1.

In the variant forms of embodiment shown in FIGS. 1-3, the curved internal tubular element 12 has a tubular cross section that extends along said curved axis Z and covers the entire internal surface 13 of the curved external tubular element 11.

The curved internal tubular element 12 has a substantially uniform thickness S in its cross section (FIGS. 1 and 2), even if it is not excluded that, in other forms of embodiment as shown in FIG. 3, the curved internal tubular element 12 has a variable thickness S, for example greater in proximity to the extrados 18 and smaller in proximity to the intrados 20.

Figure 4:
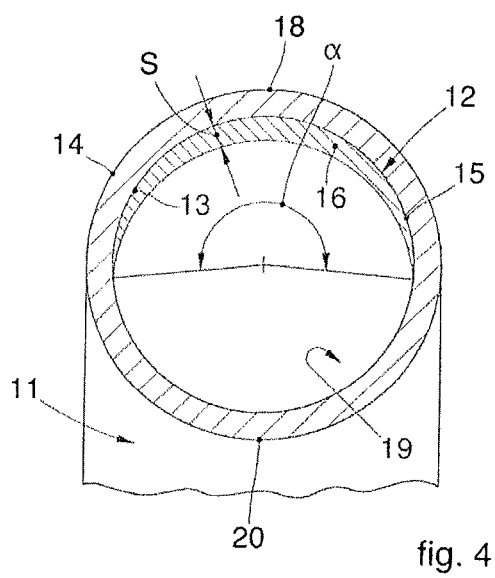
FIG. 4 is a section view of a second variant of the segment of tube in FIG. 1.
Figure 5:
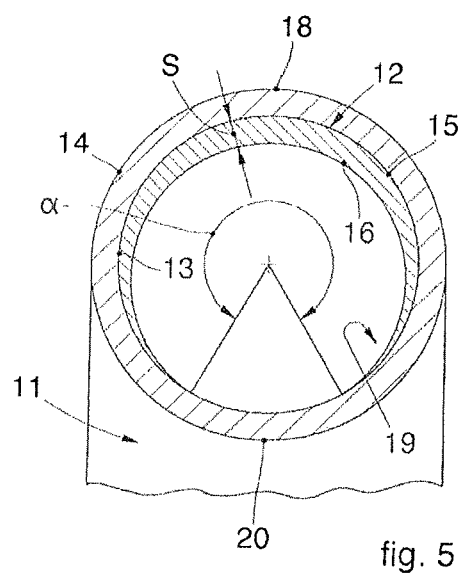
FIG. 5 is a section view of a third variant of the segment of tube in FIG. 1.
Figure 6:
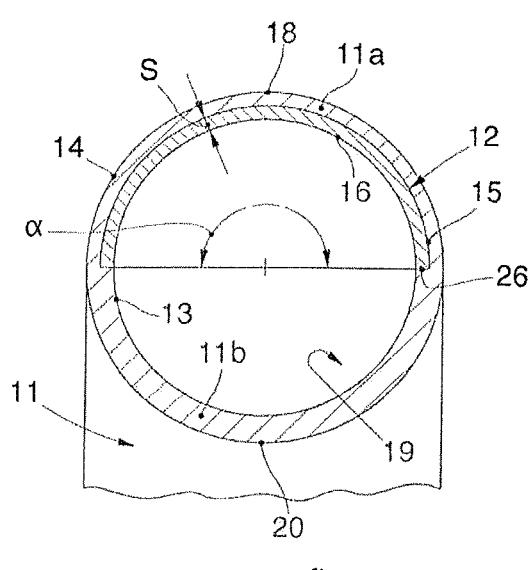
FIG. 6 is a section view of a fourth variant of the segment of tube in FIG. 1.

In other variant forms of embodiment, for example those shown in FIGS. 4-6, it is provided that the curved internal tubular element 12 has a cross section with an annular sector, that is, it covers only part of the internal surface 13 of the curved external tubular element 11. In other words, the curved internal tubular element 12 develops circumferentially for an angle $\alpha$ less than 360°, for example about 180° (FIGS. 4 and 6) or about 240° (FIG. 5).

Indeed, in this case, it is provided that the curved internal tubular element 12 and the internal surface 13 of the curved external tubular element 11 not affected by the curved internal tubular element 12 together define a passage cavity 19 for the abrasive material to be transferred. Instead, in other variants, the passage cavity 19 is entirely defined by the curved internal tubular element 12 and more precisely by the internal surface 16 of the curved internal tubular element 12 (FIGS. 1-3).

Forms of embodiment of the present invention provide that the curved internal tubular element 12 is disposed inside the curved external tubular element 11, substantially in correspondence to its extrados 18, that is, in correspondence to the greater radius of curvature of the curved external tubular element 11. The extrados 18 of the curved external tubular element 11 is subjected, during use, to a greater erosive effect and the presence of the curved internal tubular element 12 with properties of resistance to wear in this zone allows to increase the operating life of the curved tubular segment 10.

In forms of embodiment shown in FIGS. 3-5, it is provided that the curved internal tubular element 12 has a variable thickness S along the circumferential development, assuming a maximum value in proximity to the extrados 18, that is, at the point of maximum wear, and a minimum value as it moves toward the intrados 20 of the curved external tubular element 11.

The variation of the thickness S of the curved internal tubular element 12, from the extrados 18 toward the intrados 20, is advantageously gradual and defined so as to obtain a solution of gradual continuity between the curved internal tubular element 12 and the internal surface 13 of the curved external tubular element 11 and without irregularities. Possible irregularities present in the passage cavity 19 could increase the phenomena of wear and reduce the working life of the curved tubular element 10.

In the variant shown in FIG. 6, it is provided that the curved external tubular element 11 comprises two parts, an upper part 11a and a lower part 11b, the first disposed toward the extrados 18, and the second disposed toward the intrados 20 and both with the same external radius of the cross section.

The upper part 11a, disposed toward the extrados 18, has a smaller thickness than the lower part 11b disposed toward the intrados 20, thus identifying an indentation 26 that defines, with the internal surface 13 of the curved external tubular element 11, a housing seating 27 in which the curved internal tubular element 12 can be disposed once it is inserted inside the curved external tubular element 11.

The curved internal tubular element 12 disposed inside the housing seating 27 is configured to define, together with the lower part 11b of the curved external tubular element 11, a passage cavity 19, with a circular, continuous and uniform shape, for the passage of the abrasive material.

At the two ends of the curved external tubular element 11 two flanges 21 (FIGS. 1 and 2) can be associated, by welding for example, to connect to other straight or curved tubes.

The flanges 21 can provide at least a covering ring 22, disposed inside the flanges 21, also made of anti-wear material of the type described previously and disposed in continuity with the curved internal tubular element 12.

Forms of embodiment provide that the flanges 21 and/or the covering rings 22 are configured to constrain the position of the curved internal tubular element 12 along the curved axis Z.

To make the curved tubular segment 10 it is provided to use a forming mold 25 conveniently consisting of at least an upper part 23 and at least a lower part 24, separable from each other. In the surfaces of the mold 25 that come into contact with the curved external tubular element 11, molding seatings 28a, 28b (FIG. 7) are made, worked on the shape and geometry of the curved tubular segment 10 to be obtained. The molding seating 28a made in the upper part of the mold 23 and the molding seating 28b made in the lower part of the mold 24 can be the two parts of the negative of the external surface 14 of the curved external tubular element 11, obtained by sectioning with a through plane through the line of the intrados 20 and the line of the extrados 18. It is not excluded that the mold 25 can consist of an equal number or more than two parts 23, 24 obtained by sectioning the curved external tubular element 11 made in different directions to that explained above.

Figure 10:
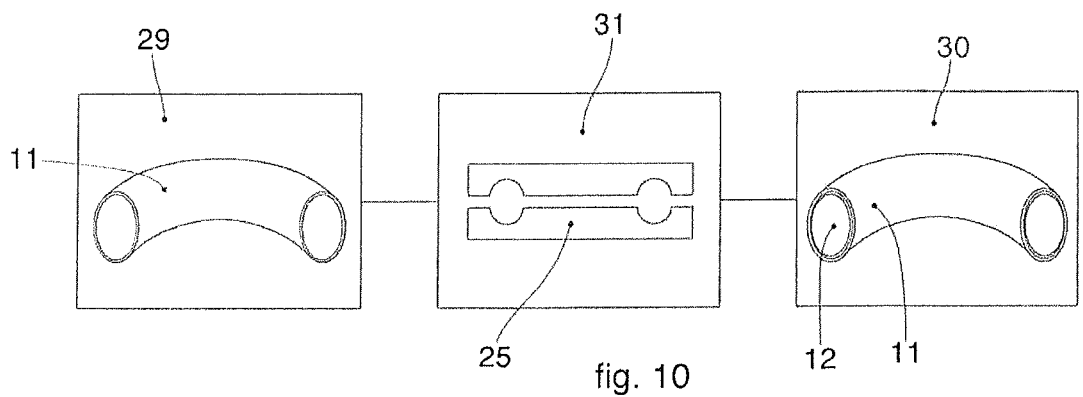
FIG. 10 is a diagram of the apparatus to make a segment of tube in accordance with the present invention.

The apparatus that allows to make the curved tubular segment in accordance with the present invention comprises at least a heating unit 29, at least a molding unit 31 and at least a cooling unit 30 as shown in FIG. 10.

In accordance with variant forms of embodiment, the at least one heating unit 29 is provided to heat the curved external tubular element 11 to a value around its temperature of deformation.

In accordance with variant forms of embodiment, the at least one molding unit 31 consists of at least a forming mold 25 that closes to apply a pressure on the external surface 14 of the curved external tubular element 11 against the external surface 15 of the curved internal tubular element 12.

In accordance with variant forms of embodiment, the at least one cooling unit 30 is provided to achieve the shrinkage effect of the curved external tubular element 11 by means of cooling and thus obtain a tube without gaps between the curved external tubular element 11 and the curved internal tubular element 12.

In accordance with variant forms of embodiment, the cooling unit 30 can be for example a cooling unit using air, or water, or cooling liquid or any other known type.

The method to make the curved tubular segment 10 provides that the curved external tubular element 11 and the curved internal tubular element 12 are made separately and of different materials in relation to their specific different functions.

In particular, it is therefore preferable to make the curved external tubular element 11 of materials with a high mechanical resistance and such as to resist the required working pressures and possible knocks. As far as the curved internal tubular element 12 is concerned, it is advantageous to make it of a material with a high resistance to wear.

Initially, the curved external tubular element 11 is heated by means of the heating unit 29 to take it to a temperature around its deformation and dilation temperature. The heating can be achieved by means for example of a gas furnace, an induction furnace or any other means suitable to the purpose.

The curved external tubular element 11, made for example of steel, aluminum or other heat deformable material, is taken by heating to its deformation temperature: to quote an example, construction steel is taken to an approximate temperature about 850° C.

When this suitable temperature has been reached, it is possible to insert the curved internal tubular element 12 inside the curved external tubular element 11.

Figure 7:
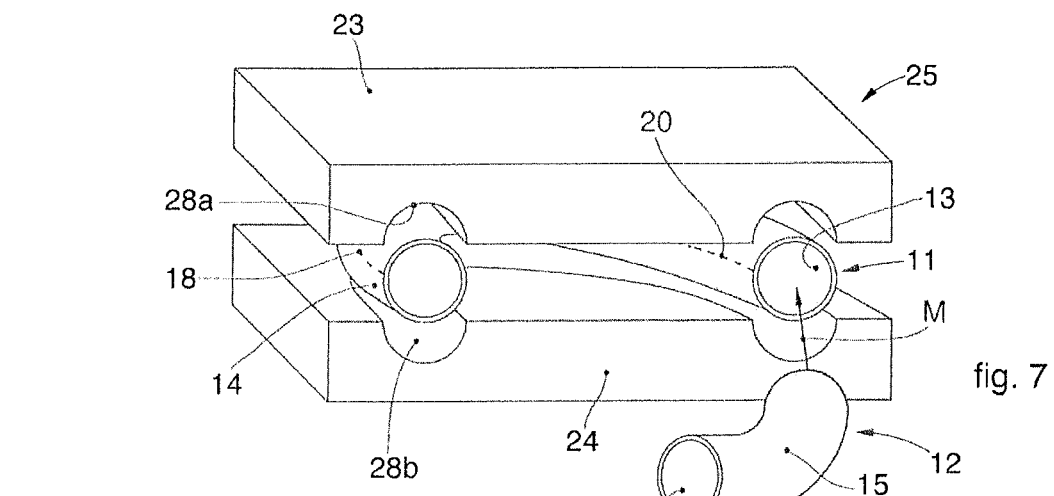
FIG. 7 is a perspective view of a forming mold used in the method according to the present invention.
Figure 8:
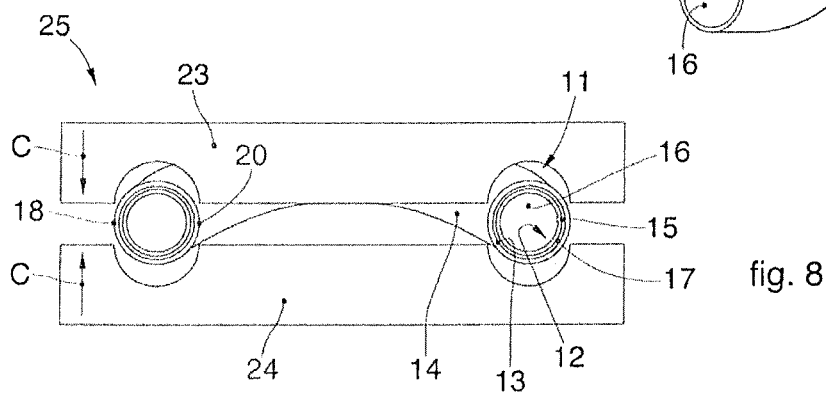
FIG. 8 is a front view of the forming mold in FIG. 7 in accordance with a first operating condition.

During this step the curved external tubular element 11 is positioned inside the forming mold 25 which is in the open position, that is, with the upper part 23 separate from the lower part 24 by a measurement at least more than the external diameter of the curved external tubular element 11 when heated, as visible in FIG. 7. At this point, the curved internal tubular element 12 is inserted inside the curved external tubular element 11, for example in the direction of movement indicated by the arrow M (FIG. 7).

In accordance with variant forms of embodiment, if the curved internal tubular element 12 has a cross section with annular sector, that is, it covers only a reduced portion of the internal surface 13 of the curved external tubular element 11, disposable completion elements can be provided which re-establish the whole circumference of the curved internal tubular element 12 and which are discharged at the end of the molding cycle. The insertion can be performed manually or in any case with other known positioning systems, for example automated positioning systems.

Since the curved internal tubular element 12 is inserted when the curved external tubular element 11 is in a heated condition, in which the constituent material is subjected to a dilation, even of a few millimeters, a play or interspace 17 is created between the external surface 15 of the curved internal tubular element 12 and the internal surface 13 of the curved external tubular element 11, which facilitates the insertion operation and correct functioning.

Figure 9:
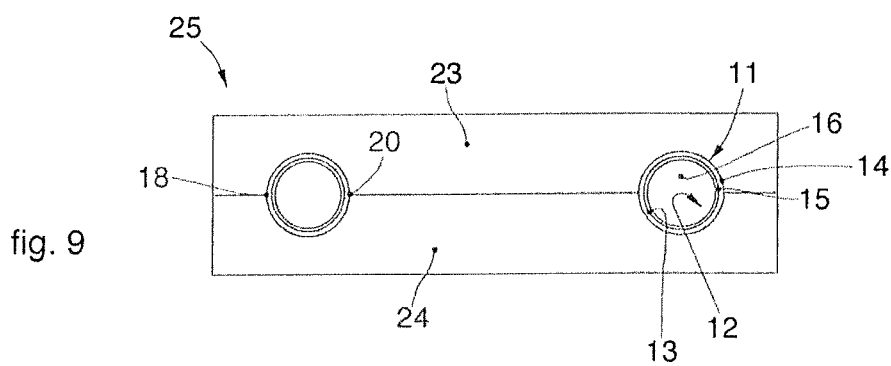
FIG. 9 is a front view of the forming mold in FIG. 7 in accordance with a second operating condition.

Finally, the mold 25 is progressively closed in the direction of arrows C (FIG. 8), for example by means of a press, initially taking the upper part 23 and the lower part 24 into contact with the external surface 14 of the curved external tubular element 11 and subsequently also taking the upper part 23 into contact with the lower part 24 so as to close the forming mold 25 (FIG. 9).

When closing is completed, the forming mold 25, exploiting its heated condition, has formed the curved external tubular element 11 to the desired geometry, that is, the internal surface 13 of the curved external tubular element 11 is made to adhere exactly to the external surface 15 of the curved internal tubular element 12.

Subsequently, the mold is opened and the curved external tubular element 11 and the curved internal tubular element 12 are cooled.

The shrinkage of the material as a result of the cooling renders definitive the coupling of the two elements.

Advantageously, to reduce working times, the step of closing the forming mold 25 can also take place at the same time as a cooling step carried out by means of the cooling unit 30.

The curved tubular segment 10 thus obtained is the exact union of the curved external tubular element 11 and the curved internal tubular element 12, in which the internal surface 13 of the former and the external surface 15 of the latter adhere perfectly, since the interspace 17 of air that was formed between the two has been eliminated. The curved external tubular element 11 and the curved internal tubular element 12 are thus solid and collaborate from a mechanical point of view when they are subjected to stresses due to the internal pumping pressure of the concrete.

Moreover the weight of the curved tubular segment 10 is less than those of the state of the art, since in this way the filling mean has been eliminated.

It is clear that modifications and/or additions of parts may be made to the curved tubular segment 10 to transport concrete, to the apparatus and corresponding method as described heretofore, without departing from the field and scope of the present invention.

It is also clear that, although the present invention has been described with reference to some specific examples, a person of skill in the art shall certainly be able to achieve many other equivalent forms of curved tubular segment 10 to transport concrete, apparatus and corresponding method, having the characteristics as set forth in the claims and hence all coming within the field of protection defined thereby.

The invention claimed is:

1. Method for producing a tube or curved segment of tube for transferring abrasive materials, comprising a curved external tubular element and a curved internal tubular element made of a material having a resistance to wear greater than that of the curved external tubular element and having a cross section such as to cover at least part of the internal surface of the curved external tubular element, wherein the method provides to make said curved external tubular element and said curved internal tubular element separately, the method comprising:
   heating said curved external tubular element at least to around its temperature of deformation,
   inserting said curved internal tubular element inside said curved external tubular element after said curved external tubular element is heated,
   closing a mold, and applying a pressure to an external surface of the curved external tubular element against an external surface of the curved internal tubular element, making use of the heated condition of the curved external tubular element to form the curved external tubular element on the exact geometry of the curved internal tubular element, and
   opening the mold and cooling with consequent shrinkage of the curved external tubular element on the curved internal tubular element.

2. Method as in claim 1, wherein the forming of said curved external tubular element on said curved internal tubular element takes place via at least two parts of said mold that progressively close, causing said internal surface of the curved external tubular element to adhere exactly to the external surface of the curved internal tubular element.

3. Method as in claim 1, wherein said curved internal tubular element has a cross section such as to cover the entire internal surface of said curved external tubular element.

4. Method as in claim 1, wherein said curved internal tubular element has a cross section such as to cover only part of the internal surface of said curved external tubular element.

5. Method as in claim 4, wherein said curved internal tubular element is disposed in correspondence with the extrados of said curved external tubular element.

6. Method as in claim 5, wherein said curved internal tubular element, together with a lower part of said curved external tubular element, defines a passage cavity with a circular shape.

7. Method as in claim 1, wherein said curved internal tubular element extends for the same curved extension as said curved external tubular element.

8. Method as in claim 1, wherein said curved internal tubular element has a circumferentially variable thickness, with a maximum value in proximity to the extrados, and which diminishes moving toward the intrados of said curved external tubular element.

9. Method as in claim 1, wherein flanges are associated at ends of the curved tubular segment.

10. Method as in claim 9, wherein inside said flanges at least one covering ring is disposed, made of wear resistant material, in continuity with the curved internal tubular element.

* * * * *